(12) United States Patent
Lee et al.

(10) Patent No.: US 11,507,783 B2
(45) Date of Patent: Nov. 22, 2022

(54) APPARATUS FOR RECOGNIZING OBJECT OF AUTOMATED DRIVING SYSTEM USING ERROR REMOVAL BASED ON OBJECT CLASSIFICATION AND METHOD USING THE SAME

(71) Applicant: ELECTRONICS AND TELECOMMUNICATIONS RESEARCH INSTITUTE, Daejeon (KR)

(72) Inventors: Dong-Jin Lee, Daejeon (KR); Do-Wook Kang, Seoul (KR); Jungyu Kang, Daejeon (KR); Joo-Young Kim, Daejeon (KR); Kyoung-Wook Min, Sejong-si (KR); Jae-Hyuck Park, Daejeon (KR); Kyung-Bok Sung, Daejeon (KR); Yoo-Seung Song, Daejeon (KR); Taeg-Hyun An, Daejeon (KR); Yong-Woo Jo, Daejeon (KR); Doo-Seop Choi, Sejong-si (KR); Jeong-Dan Choi, Daejeon (KR); Seung-Jun Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/380,663

(22) Filed: Jul. 20, 2021

(65) Prior Publication Data
US 2022/0164609 A1    May 26, 2022

(30) Foreign Application Priority Data
Nov. 23, 2020 (KR) .................. 10-2020-0157586

(51) Int. Cl.
*G06K 9/62* (2022.01)
*G06T 7/80* (2017.01)
(Continued)

(52) U.S. Cl.
CPC .......... *G06K 9/6265* (2013.01); *G06K 9/628* (2013.01); *G06K 9/6257* (2013.01);
(Continued)

(58) Field of Classification Search
CPC .. G06K 9/6265; G06K 9/6257; G06K 9/6277; G06K 9/628; G06K 9/6288;
(Continued)

(56) References Cited

U.S. PATENT DOCUMENTS
2009/0154793 A1    6/2009  Shin et al.
2015/0109603 A1    4/2015  Kim et al.
(Continued)

FOREIGN PATENT DOCUMENTS
KR    10-2019-0095592    8/2019
KR    10-2168753    10/2020

OTHER PUBLICATIONS

Wei et al, "LiDAR and Camera Detection Fusion in a Real-Time Industrial Multi-Sensor Collision Avoidance System" (published in Computer Vision and Pattern Recognition, May 2018) (Year: 2018).*
(Continued)

*Primary Examiner* — Casey L Kretzer
(74) *Attorney, Agent, or Firm* — Kile Park Reed & Houtteman PLLC (57) ABSTRACT

Disclosed herein are an object recognition apparatus of an automated driving system using error removal based on object classification and a method using the same. The object recognition method is configured to train a multi-object classification model based on deep learning using training data including a data set corresponding to a noise
(Continued)

class, into which a false-positive object is classified, among classes classified by the types of objects, to acquire a point cloud and image data respectively using a LiDAR sensor and a camera provided in an autonomous vehicle, to extract a crop image, corresponding to at least one object recognized based on the point cloud, from the image data and input the same to the multi-object classification model, and to remove a false-positive object classified into the noise class, among the at least one object, by the multi-object classification model.

20 Claims, 8 Drawing Sheets (51) Int. Cl.
G06V 10/24 (2022.01)
G06V 20/56 (2022.01)
G06V 20/58 (2022.01)
G06V 20/64 (2022.01)

(52) U.S. Cl.
CPC ......... *G06K 9/6277* (2013.01); *G06K 9/6288* (2013.01); *G06T 7/80* (2017.01); *G06V 10/245* (2022.01); *G06V 20/56* (2022.01); *G06V 20/58* (2022.01); *G06V 20/647* (2022.01); *G06T 2207/10028* (2013.01); *G06T 2207/30252* (2013.01)

(58) Field of Classification Search
CPC ............... G06T 7/80; G06T 2207/1002; G06T 2207/30252; G06V 10/245; G06V 20/56; G06V 20/58; G06V 20/647
See application file for complete search history.

(56) References Cited

U.S. PATENT DOCUMENTS

2019/0147245 A1 5/2019 Qi et al.
2021/0326651 A1* 10/2021 Northcutt ............. G06K 9/6264

OTHER PUBLICATIONS

Dongjin Lee et al., "A 3D object detection method using Ouster's LiDAR in an urban area," The Institute of Electronics and Information Engineers, Jun. 2019, pp. 1434-1436.

* cited by examiner

20190923-110935_DOMADONG_00000149.jpg

APPARATUS FOR RECOGNIZING OBJECT OF AUTOMATED DRIVING SYSTEM USING ERROR REMOVAL BASED ON OBJECT CLASSIFICATION AND METHOD USING THE SAME

CROSS REFERENCE TO RELATED APPLICATION

This application claims the benefit of Korean Patent Application No. 10-2020-0157586, filed Nov. 23, 2020, which is hereby incorporated by reference in its entirety into this application.

BACKGROUND OF THE INVENTION

1. Technical Field

The present invention relates generally to technology for recognizing objects in the driving environment of an Automated Driving System (ADS), and more particularly to technology for minimizing the occurrence of false positives by improving the performance of classification of dynamic and static objects located in the vicinity of an autonomous vehicle.

2. Description of the Related Art

An Automated Driving System (ADS) is configured with three phases, which are recognition, determination, and control.

At the recognition phase, dynamic and static objects are detected using sensors, such as LiDAR, radar, a camera, and the like, and the tracked information is determined and delivered to a control system, whereby autonomous driving may be realized, without collisions with nearby obstacles.

Recently, 3D object detection data sets have been published by autonomous-driving-related global companies, and competitions using such 3D object detection data sets are held. In such competitions, most technologies ranked high are 3D object detection technologies using only LiDAR data even though camera data is provided.

However, when only LiDAR data is used, because texture or color information is not contained therein, unlike in camera data, it is difficult to differentiate objects having similar shapes from each other, or the number of false positives is increased.

Documents of Related Art (Patent Document 1) Korean Patent Application Publication No. 10-2019-0095592, published on Aug. 16, 2019 and titled "Method and apparatus for object detection using LiDAR sensor and camera".

SUMMARY OF THE INVENTION

An object of the present invention is to improve the performance of classification of multiple objects into multiple classes and minimize the occurrence of false positives through a process in which objects detected using LiDAR data are revalidated using image data.

Another object of the present invention is to more accurately predict the trajectories of nearby dynamic objects or static objects using data acquired from a LiDAR sensor and a camera sensor mounted on an automated driving platform, thereby improving driving stability when autonomous driving is performed.

A further object of the present invention is to recognize objects using data including texture and color information based on image data, thereby increasing the object recognition rate by an autonomous vehicle.

In order to accomplish the above objects, an object recognition method of an automated driving system according to the present invention includes training a multi-object classification model based on deep learning using training data including a data set corresponding to a noise class, into which a false-positive object is classified, among classes classified by the types of objects; acquiring a point cloud and image data respectively using a LiDAR sensor and a camera provided in an autonomous vehicle; extracting a crop image corresponding to at least one object recognized based on the point cloud from the image data and inputting the same to the multi-object classification model; and removing a false-positive object classified into the noise class, among the at least one object, by the multi-object classification model.

Here, the multi-object classification model may output probabilities of respective classes for an object included in the crop image.

Here, removing the false-positive object may be configured to classify the object into the noise class when the probability of the noise class is largest, among the probabilities of the respective classes.

Here, the multi-object classification model may set a first weight for the image data and a second weight for the point cloud, and may output the probabilities of the respective classes by applying the first weight and the second weight.

Here, the first weight may be set greater than the second weight.

Here, training the multi-object classification model may include acquiring a point cloud for training and image data for training based on the LiDAR sensor and the camera; generating comment data using the point cloud for training and the image data for training; and generating training and verification data sets corresponding to the training data based on the comment data classified into classes.

Here, generating the comment data may be configured to detect at least one object for training based on the point cloud for training and to project the at least one object for training to the image data for training using a projection matrix, thereby generating the comment data so as to correspond to a 2D image for the at least one object for training.

Here, the crop image may be extracted so as to correspond to the process of generating the comment data.

Here, the object recognition method may further include calibrating the LiDAR sensor and the camera.

Here, calibrating the LiDAR sensor and the camera may be configured to perform calibration in such a way that an image is acquired by opening the aperture of the camera at the moment at which the laser beam of the LiDAR sensor passes the center of the field of view of the camera in order to synchronize the LiDAR sensor with the camera.

Also, an object recognition apparatus of an automated driving system according to an embodiment of the present invention includes a processor for training a multi-object classification model based on deep learning using training data including a data set corresponding to a noise class, into which a false-positive object is classified, among classes classified by the types of objects, acquiring a point cloud and image data respectively using a LiDAR sensor and a camera provided in an autonomous vehicle, extracting a crop image corresponding to at least one object recognized based on the point cloud from the image data and inputting the same to the multi-object classification model, and removing a false-positive object classified into the noise class, among the at least one object, by the multi-object classification model; and memory for storing the multi-object classification model.

Here, the multi-object classification model may output probabilities of respective classes for an object included in the crop image.

Here, the processor may classify the object into the noise class when the probability of the noise class is largest, among the probabilities of the respective classes.

Here, the multi-object classification model may set a first weight for the image data and a second weight for the point cloud, and may output the probabilities of the respective classes by applying the first weight and the second weight.

Here, the first weight may be set greater than the second weight.

Here, the processor may be configured to acquire a point cloud for training and image data for training based on the LiDAR sensor and the camera, to generate comment data using the point cloud for training and the image data for training, and to generate training and verification data sets, corresponding to the training data, based on the comment data classified into classes.

Here, the processor may detect at least one object for training based on the point cloud for training and project the at least one object for training to the image data for training using a projection matrix, thereby generating the comment data so as to correspond to a 2D image for the at least one object for training.

Here, the crop image may be extracted so as to correspond to the process of generating the comment data.

Here, the processor may calibrate the LiDAR sensor and the camera.

Here, the processor may perform calibration in such a way that an image is acquired by opening the aperture of the camera at the moment at which the laser beam of the LiDAR sensor passes the center of the field of view of the camera in order to synchronize the LiDAR sensor with the camera.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

Figure 1:
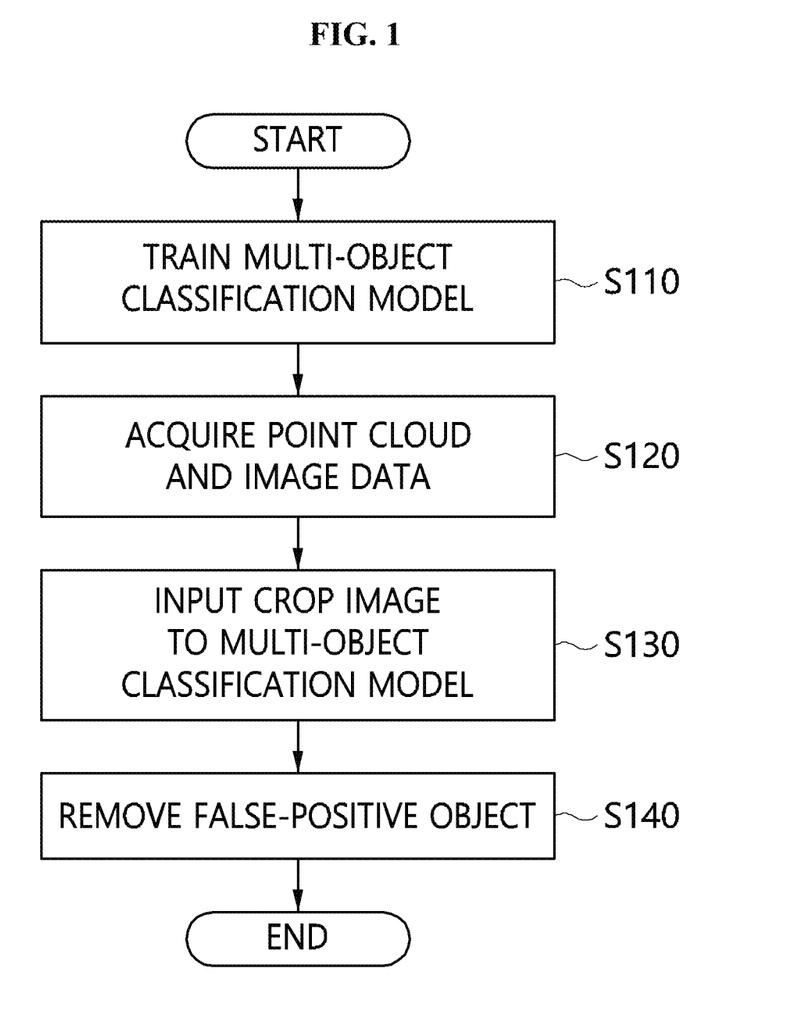
FIG. 1 is a flowchart illustrating an object recognition method of an automated driving system using error removal based on object classification according to an embodiment of the present invention.

FIG. 1 is a flowchart illustrating an object recognition method of an automated driving system using error removal based on object classification according to an embodiment of the present invention.

Referring to FIG. 1, in the object recognition method of an automated driving system using error removal based on object classification according to an embodiment of the present invention, a multi-object classification model based on deep learning is trained at step S110 based on training data including a data set corresponding to a noise class, into which false-positive objects are classified, among classes classified by the types of objects.

Figure 2:
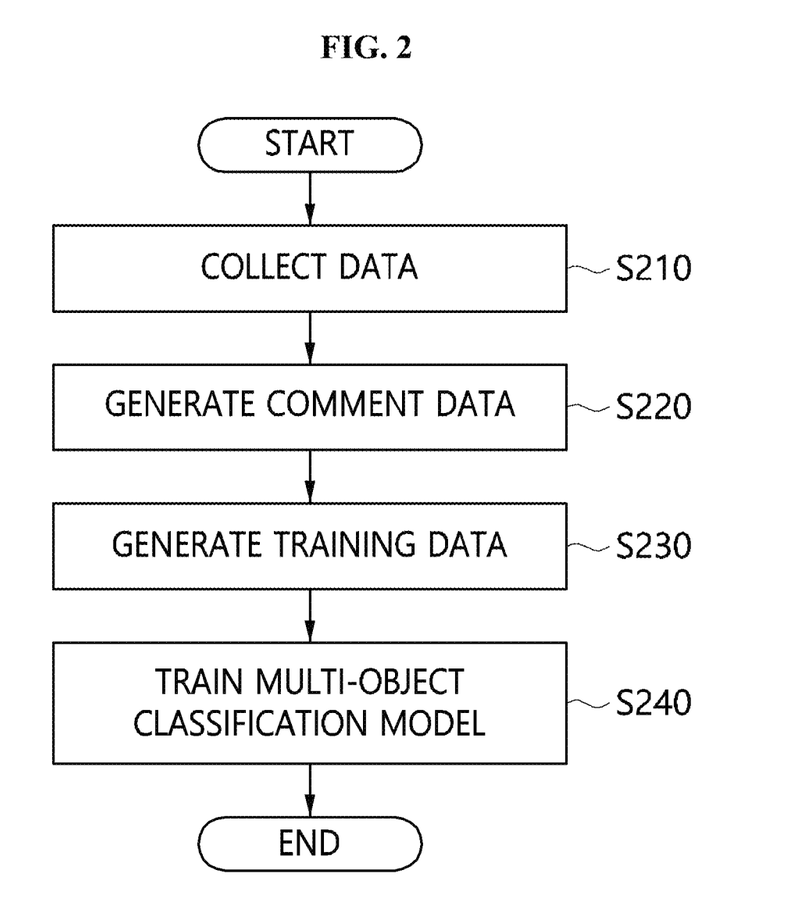
FIG. 2 is a flowchart illustrating the process of training a multi-object classification model in an object recognition method according to an embodiment of the present invention.

For example, in the present invention, the process of training the multi-object classification model may be performed as shown in FIG. 2 using a separate training device.

Referring to FIG. 2, in the process of training the multi-object classification model, first, a point cloud for training and image data for training may be acquired at step S210 based on a LiDAR sensor and a camera mounted on an automated driving platform.

Here, one or more LiDAR sensors and one or more cameras may be provided.

Also, although not illustrated in FIG. 1, the LiDAR sensor and the camera may be calibrated in advance in order to project an object detected using the LiDAR sensor to image data acquired using the camera in the object recognition method of an automated driving system using error removal based on object classification according to an embodiment of the present invention.

Here, in order to synchronize the LiDAR sensor with the camera, calibration may be performed in such a way that an image is acquired by opening the aperture of the camera at the moment at which the laser beam of the LiDAR sensor passes the center of the field of view of the camera.

Subsequently, comment data may be generated at step S220 using the point cloud for training and the image data for training.

Here, at least one object for training is detected based on the point cloud for training, and the at least one object for training is projected to the image data for training using a projection matrix, whereby comment data may be generated so as to correspond to a 2D image for the at least one object for training.

Figure 3:
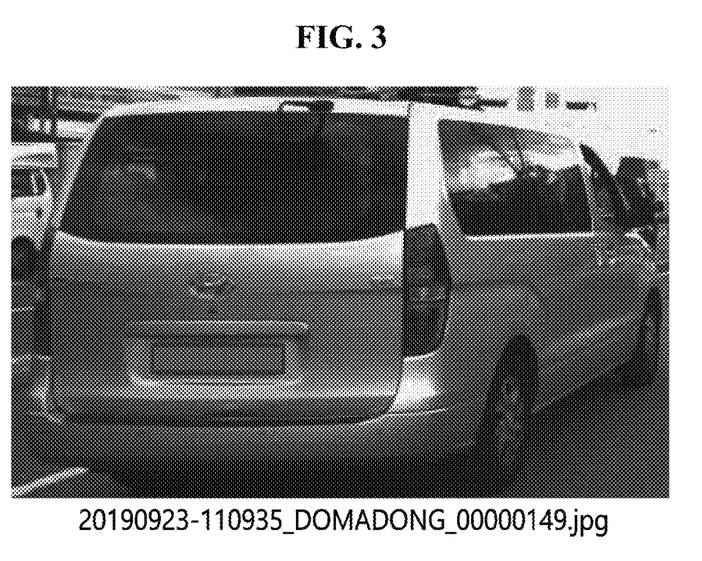
FIGS. 3 to 4 are views illustrating an example of comment data according to the present invention.

For example, comment data like what is illustrated in FIG. 3 may be generated by projecting a single object for training to image data. Here, because comment data is generated for all objects for training that are detected based on the point cloud for training, when a large number of objects are detected, comment data may be generated for each of the objects, as shown in FIG. 4.

Here, the generated comment data may be stored in the form of images. For example, each piece of comment data may be stored in the form of 'data-set-name_8-digit-number.jpg', as shown in FIGS. 3 to 4, for convenience of use of the system, in which case any one of numbers 0 to 99999999, which is not a duplicate with any other, may be input as the 8-digit number.

Subsequently, training and verification data sets corresponding to training data may be generated at step S230 based on the comment data classified into respective classes.

Figure 4:
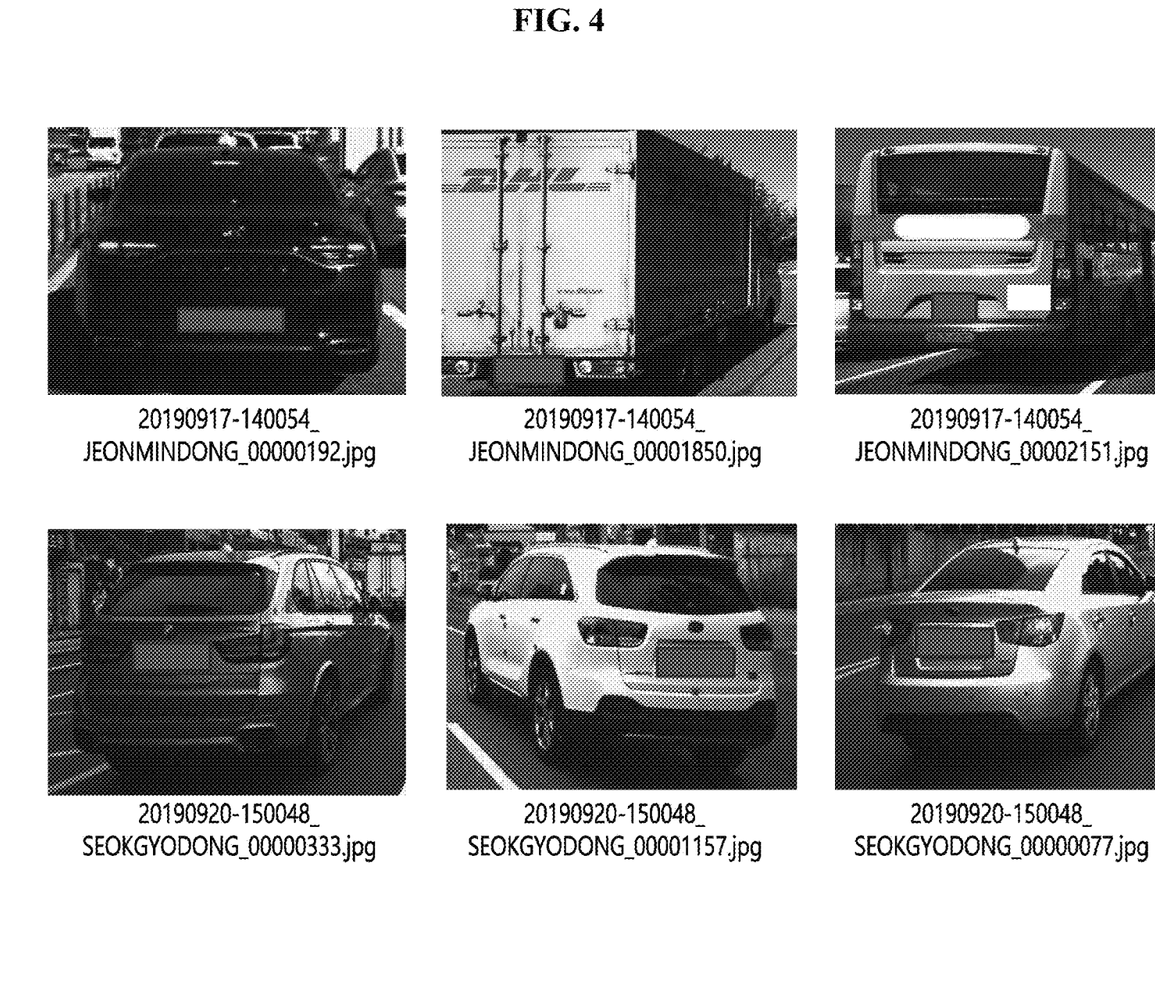

For example, when multiple pieces of comment data are generated and stored, as illustrated in FIG. 4, a worker involved in the comment looks at the image of the object included in the comment data and classifies the comment data as one of nine classes, which are a car, a truck, a bus, any other vehicle, a pedestrian, a person who is riding a bicycle (or motorcycle), a traffic cone, noise, and an unclassifiable object.

Here, the object classified into a noise class may be a false-positive object, and the object classified into an unclassifiable object class may include the case where there are no characteristics, the case where the image is dark, and the like.

Also, when multiple objects are included in a single image, the object that is most suitable for the image may be selected, and classification may be performed based thereon. Here, the criterion for selection may be the size of an object appearing in the image. For example, when two objects A and B are included in a single image, the object having a larger size, among A and B, may be selected as the object of the image, and classification into a class may be performed depending on the selected object.

When the objects of the images corresponding to the respective pieces of comment data have been classified into classes through the above-described process, the comment data corresponding to the classes, from which the unclassifiable object class is excluded, may be used as the training and verification data sets.

Subsequently, the multi-object classification model may be trained at step S240 using the generated training and verification data sets.

Figure 5:
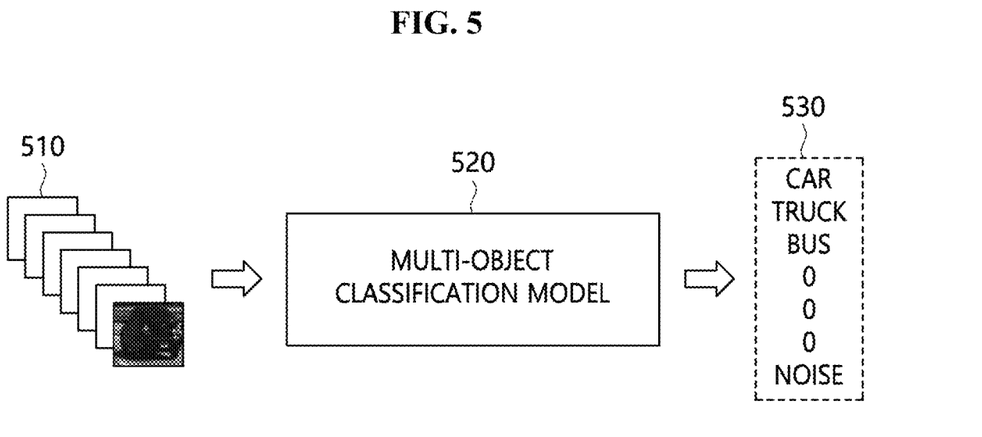
FIG. 5 is a view illustrating an example of the process of training a multi-object classification model according to the present invention.

For example, referring to FIG. 5, training may be performed in such a way that a training data set 510, generated using comment data like what is illustrated in FIGS. 3 to 4, is input to a multi-object classification model 520, and the probabilities 530 of respective classes output from the multi-object classification model 520 are verified through a comparison with the class of the corresponding training data set 510.

For example, a model having a fast inference time while having good classification performance, such as ResNet-18 or GoogleNet, may be selected as the multi-object classification model 520. Accordingly, the model exhibiting the highest accuracy for the verification data set may be selected from among various models, and may then be used as the multi-object classification model 520.

Also, although not illustrated in FIG. 2, training may be performed additionally using a data augmentation scheme, including rotation of an image, left/right flip thereof, changing the size thereof after randomly cutting the image, and the like, in order to improve the performance of the multi-object classification model 520.

Also, in order to learn imbalanced data, the multi-object classification model 520 may be trained by using focal loss as a cost function.

Also, in the object recognition method of an automated driving system using error removal based on object classification according to an embodiment of the present invention, a point cloud and image data are acquired at step S120 using the LiDAR sensor and the camera in the autonomous vehicle.

Here, the LiDAR sensor and the camera provided in the autonomous vehicle may be in the state in which they have been calibrated and synchronized in advance.

Here, one or more LiDAR sensors and one or more cameras may be provided according to the present invention. Generally, when multiple objects in an autonomous driving environment are recognized using the LiDAR sensor and the camera together, the speed of recognition is lower than when only LiDAR data is used, and a large number of cameras have to be installed in order to acquire data from all directions. However, the present invention may be applied as long as one or more cameras are installed, and has an advantage in that real-time processing is possible even though a camera-based multi-object classifier is added.

Also, in the object recognition method of an automated driving system using error removal based on object classification according to an embodiment of the present invention, a crop image corresponding to at least one object recognized based on the point cloud is extracted from the image data and is input to the multi-object classification model at step S130.

Here, the at least one object may be detected by preprocessing the point cloud acquired from the LiDAR sensor based on a 3D multi-object detection technique based on deep learning.

For example, when a deep-learning-based 3D multi-object detection technique having good object detection performance and capable of operating in real time, such as PointPillars, is used, the position (x, y, z) of an object, the size (width, height, length) thereof, classification information pertaining thereto (including information about class probabilities), the heading orientation (yaw angle) thereof, the confidence score thereof, and the like may be output for each of the at least one object.

Here, the crop image may be extracted so as to correspond to the process of generating comment data.

For example, the at least one object is projected to the image data using a projection matrix, whereby a crop image corresponding to a 2D image for the at least one object may be generated.

Here, referring to Equation (1) below, the detection result corresponding to the at least one object may be projected to the image data using calibration information between the LiDAR sensor and the camera.

$$y = PRTx$$

$x \in R^{3 \times 1}$ rectified camera coordinate $y \in R^{4 \times 1}$ lidar coordinate $P \in R^{3 \times 4}$ projection matrix $R \in R^{4 \times 4}$ rectifying matrix $T \in R^{4 \times 4}$ lidar to camera transformation matrix (1)

In this manner, the detection result pertaining to the at least one object may be converted from a 3D form into a crop image in the form of a 2D bounding box.

Also, in the object recognition method of an automated driving system using error removal based on object classification according to an embodiment of the present invention, a false-positive object classified by the multi-object classification model into a noise class, among the at least one object, is removed at step S140.

Here, the multi-object classification model may output the probabilities of respective classes for the object included in the crop image.

For example, when crop images generated so as to correspond to at least one object are input to the multi-object classification model trained through step S110, the multi-object classification model may output the probabilities of respective classes for the object included in each of the crop images.

Here, when the probability of a noise class is highest, among the probabilities of the respective classes, the object may be classified into a noise class.

Accordingly, the object classified into a noise class may be regarded as a false-positive object, and may be removed in the object recognition process.

Here, the multi-object classification model may set a first weight for the image data and a second weight for the point cloud, and may output the probabilities of respective classes by applying the first weight and the second weight.

Here, the first weight may be set greater than the second weight.

That is, because the image data acquired using the camera includes texture data and color information and has higher spatial resolution than the point cloud acquired using the LiDAR sensor, a value greater than the second weight may be assigned to the first weight.

$$\hat{y} = \lambda_{lidar} \times CS_{lidar} + \lambda_{cam} \times CP_{cam}$$

$K \in N^1$ Number of class $\hat{y} \in R^{1 \times K}$ output $\lambda_{lidar} \in N^1$ lidar model's weight $CS_{lidar} \in R^{1 \times K}$ confidence score for lidar model $\lambda_{cam} \in N^1$ camera model's weight $CP_{cam} \in R^{1 \times K}$ class probabilities for camera model      (2)

For example, referring to Equation (2), the first weight may be λ cam, and the second weight may be λ lidar. Here, when λ cam is assigned a weight value of 1.5, λ lidar may be assigned a weight value of 1. Here, hyper parameter values, such as λ cam or λ lidar, may be set or changed differently depending on the specifications of the sensor that is used or the reliability of a deep-learning model.

Here, the class having the largest ŷ value, among ŷ values calculated using Equation (2), may be selected as the class into which the object is to be classified, and when the class having the largest ŷ value is a noise class, the object may be regarded as a false-positive object and removed from the object recognition result.

Through the above-described object recognition method, an object detected using LiDAR data is revalidated using image data, whereby the performance of classification of multiple objects into multiple classes may be improved and the occurrence of false positives may be minimized.

Also, the trajectories of nearby dynamic objects or static objects are more accurately predicted using data acquired from a LiDAR sensor and a camera sensor mounted on an automated driving platform, whereby driving stability may be improved when autonomous driving is performed.

Also, objects are recognized using data including texture and color information based on image data, whereby the object recognition rate by an autonomous vehicle may be increased.

Figure 6:
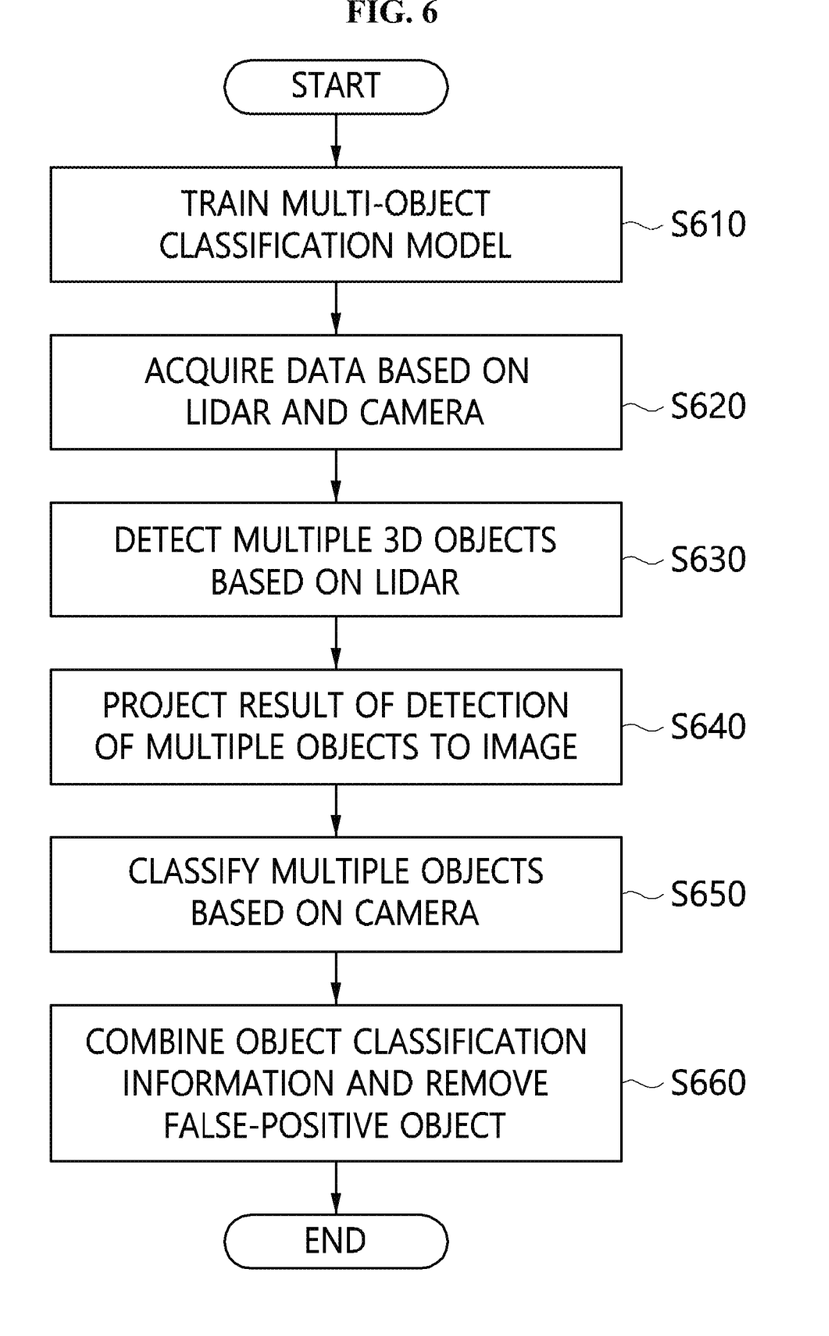
FIG. 6 is a flowchart illustrating an object recognition method in more detail according to an embodiment of the present invention.

FIG. 6 is a flowchart illustrating an object recognition method in more detail according to an embodiment of the present invention.

Referring to FIG. 6, in the object recognition method according to an embodiment of the present invention, first, a multi-object classification model may be trained based on training data at step S610.

Here, the training data may include a data set corresponding to a noise class, into which false-positive objects are classified, among classes classified by the types of objects.

Subsequently, data for recognizing an object may be acquired at step S620 based on a LiDAR sensor and a camera in an autonomous vehicle.

Here, the LiDAR sensor and the camera may be in the state in which they have been calibrated and synchronized.

Subsequently, multiple 3D objects may be detected at step S630 based on a point cloud acquired through the LiDAR sensor.

Here, the multiple 3D objects may be detected by pre-processing the point cloud, which is acquired from the LiDAR sensor, using a deep-learning-based 3D multi-object detection technique.

Subsequently, the detected multiple 3D objects may be projected to the image data acquired using the camera at step S640.

Here, the multiple 3D objects are projected to the image data using a projection matrix, whereby crop images corresponding to 2D images for the multiple 3D objects may be generated.

Subsequently, the crop images are input to the trained multi-object classification model, whereby the multiple objects may be classified at step S650.

Here, because the multi-object classification model is trained using image data including texture or color based on the camera, it may provide higher classification performance than when only the LiDAR sensor is used.

Subsequently, object classification information is combined, and an object determined to be a false-positive object based on the object classification information may be removed at step S660.

Here, the multi-object classification model may set a first weight for the image data and a second weight for the point cloud, and may output the probability that an object is classified into each class based on a combination of the LiDAR sensor and the camera by applying the first weight and the second weight.

Here, when the probability that the object is classified into a noise class is largest, among the probabilities of respective classes, the object may be determined to be a false-positive object and removed.

Figure 7:
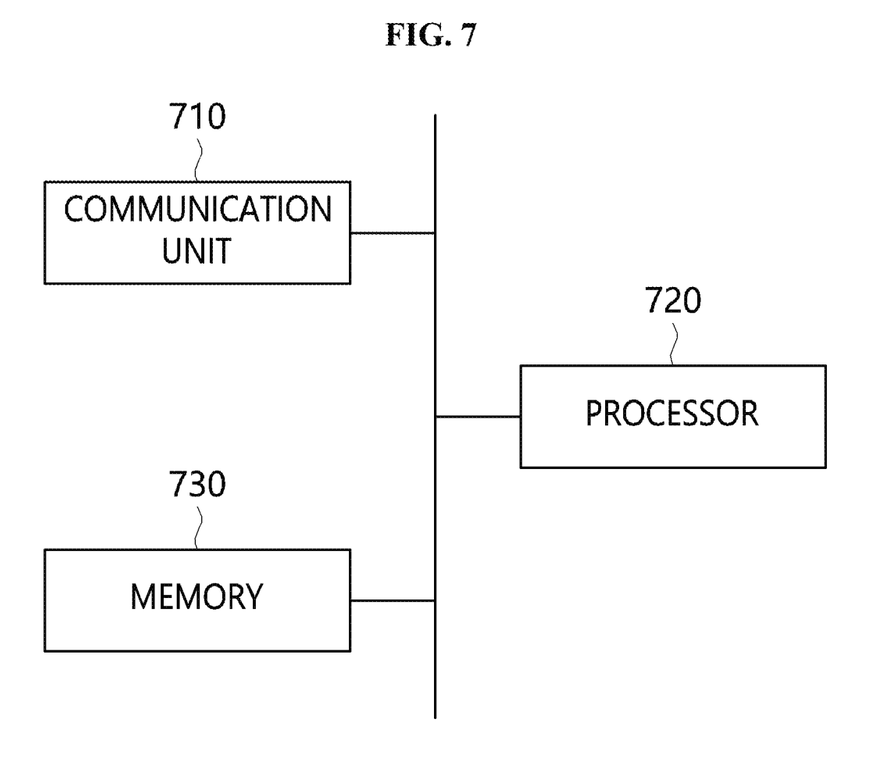
FIG. 7 is a block diagram illustrating an object recognition apparatus of an automated driving system using error removal based on object classification according to an embodiment of the present invention.

FIG. 7 is a block diagram illustrating an object recognition apparatus of an automated driving system using error removal based on object classification according to an embodiment of the present invention.

Referring to FIG. 7, the object recognition apparatus of an automated driving system using error removal based on object classification according to an embodiment of the present invention includes a communication unit 710, a processor 720, and memory 730.

The communication unit 710 may serve to transmit and receive information, required in order for the automated driving system to recognize objects, through a communication network. Here, the network provides a path via which data is delivered between devices, and may be conceptually understood to encompass networks that are currently being used and networks that have yet to be developed.

For example, the network may be an IP network, which provides service for transmission and reception of a large amount of data and uninterrupted data service through an Internet Protocol (IP), an all-IP network, which is an IP network structure that integrates different networks based on IP, or the like, and may be configured as a combination of one or more of a wired network, a Wireless Broadband (WiBro) network, a 3G mobile communication network including WCDMA, a 3.5G mobile communication network including a High-Speed Downlink Packet Access (HSDPA) network and an LTE network, a 4G mobile communication network including LTE advanced, a satellite communication network, and a Wi-Fi network.

Also, the network may be any one of a wired/wireless local area network for providing communication between various kinds of data devices in a limited area, a mobile communication network for providing communication between mobile devices or between a mobile device and the outside thereof, a satellite communication network for providing communication between earth stations using a satellite, and a wired/wireless communication network, or may be a combination of two or more selected therefrom. Meanwhile, the transmission protocol standard for the network is not limited to existing transmission protocol standards, but may include all transmission protocol standards to be developed in the future.

The processor 720 trains a deep-learning-based multi-object classification model using training data, including a data set corresponding to a noise class, into which false-positive objects are classified, among classes classified by the types of objects.

For example, in the present invention, the process of training the multi-object classification model may be performed as shown in FIG. 2 using a separate training device.

Referring to FIG. 2, in the process of training the multi-object classification model, first, a point cloud for training and image data for training may be acquired at step S210 based on a LiDAR sensor and a camera mounted on an automated driving platform.

Here, one or more LiDAR sensors and one or more cameras may be provided.

Also, the processor 720 according to an embodiment of the present invention may calibrate the LiDAR sensor and the camera in advance in order to project an object detected using the LiDAR sensor to image data acquired using the camera.

Here, in order to synchronize the LiDAR sensor with the camera, calibration may be performed in such a way that an image is acquired by opening the aperture of the camera at the moment at which the laser beam of the LiDAR sensor passes the center of the field of view of the camera.

Subsequently, comment data may be generated at step S220 using the point cloud for training and the image data for training.

Here, at least one object for training is detected based on the point cloud for training, and the at least one object for training is projected to the image data for training using a projection matrix, whereby comment data may be generated so as to correspond to a 2D image for the at least one object for training.

For example, comment data like what is illustrated in FIG. 3 may be generated by projecting a single object for training to image data. Here, because comment data is generated for all objects for training that are detected based on the point cloud for training, when a large number of objects are detected, comment data may be generated for each of the objects, as shown in FIG. 4.

Here, the generated comment data may be stored in the form of images. For example, each piece of comment data may be stored in the form of 'data-set-name_8-digit-number.jpg', as shown in FIGS. 3 to 4, for convenience of use of the system, in which case any one of numbers 0 to 99999999, which is not a duplicate with any other, may be input as the 8-digit number.

Subsequently, training and verification data sets corresponding to training data may be generated at step S230 based on the comment data classified into respective classes.

For example, when multiple pieces of comment data are generated and stored, as illustrated in FIG. 4, a worker involved in the comment looks at the image of the object included in the comment data and classifies the comment data as one of nine classes, which are a car, a truck, a bus, any other vehicle, a pedestrian, a person who is riding a bicycle (or motorcycle), a traffic cone, noise, and an unclassifiable object.

Here, the object classified into a noise class may be a false-positive object, and the object classified into an unclassifiable object class may include the case where there are no characteristics, the case where the image is dark, and the like.

Also, when multiple objects are included in a single image, the object that is most suitable for the image may be selected, and classification may be performed based thereon. Here, the criterion for selection may be the size of an object appearing in the image. For example, when two objects A and B are included in a single image, the object having a larger size, among A and B, may be selected as the object of the image, and classification into a class may be performed depending on the selected object.

When the objects of the images corresponding to the respective pieces of comment data have been classified into classes through the above-described process, the comment data corresponding to the classes, from which the unclassifiable object class is excluded, may be used as the training and verification data sets.

Subsequently, the multi-object classification model may be trained at step S240 using the generated training and verification data sets.

For example, referring to FIG. 5, training may be performed in such a way that a training data set 510, generated using comment data like what is illustrated in FIGS. 3 to 4, is input to a multi-object classification model 520, and the probabilities 530 of respective classes output from the multi-object classification model 520 are verified through a comparison with the class of the corresponding training data set 510.

For example, a model having a fast inference time while having good classification performance, such as ResNet-18 or GoogleNet, may be selected as the multi-object classification model 520. Accordingly, the model exhibiting the highest accuracy for the verification data set may be selected from among various models, and may then be used as the multi-object classification model 520.

Also, although not illustrated in FIG. 2, training may be performed additionally using a data augmentation scheme, including rotation of an image, left/right flip thereof, changing the size thereof after randomly cutting the image, and the like, in order to improve the performance of the multi-object classification model 520.

Also, in order to learn imbalanced data, the multi-object classification model 520 may be trained by using focal loss as a cost function.

Also, the processor 720 acquires a point cloud and image data through the LiDAR sensor and the camera provided in the autonomous vehicle.

Here, the LiDAR sensor and the camera provided in the autonomous vehicle may be in the state in which they have been calibrated and synchronized in advance.

Here, one or more LiDAR sensors and one or more cameras may be provided according to the present invention. Generally, when multiple objects in an autonomous driving environment are recognized using the LiDAR sensor and the camera together, the speed of recognition is lower than when only LiDAR data is used, and a large number of cameras have to be installed in order to acquire data from all directions. However, the present invention may be applied as long as one or more cameras are installed, and has an advantage in that real-time processing is possible even though a camera-based multi-object classifier is added.

Also, the processor 720 extracts a crop image, corresponding to at least one object recognized based on the point cloud, from the image data and inputs the same to the multi-object classification model.

Here, the at least one object may be detected by preprocessing the point cloud acquired from the LiDAR sensor based on a 3D multi-object detection technique based on deep learning.

For example, when a deep-learning-based 3D multi-object detection technique having good object detection performance and capable of operating in real time, such as PointPillars, is used, the position (x, y, z) of an object, the size (width, height, length) thereof, classification information pertaining thereto (including information about class probabilities), the heading orientation (yaw angle) thereof, the confidence score thereof, and the like may be output for each of the at least one object.

Here, the crop image may be extracted so as to correspond to the process of generating comment data.

For example, the at least one object is projected to the image data using a projection matrix, whereby a crop image corresponding to a 2D image for the at least one object may be generated.

Here, referring to Equation (1) below, the detection result corresponding to the at least one object may be projected to the image data using calibration information between the LiDAR sensor and the camera.

$y = PRTx$ $x \in R^{3 \times 1}$ rectified camera coordinate $y \in R^{4 \times 1}$ lidar coordinate $P \in R^{3 \times 4}$ projection matrix $R \in R^{4 \times 4}$ rectifying matrix $T \in R^{4 \times 4}$ lidar to camera transformation matrix  (1)

In this manner, the detection result pertaining to the at least one object may be converted from a 3D form into a crop image in the form of a 2D bounding box.

Also, the processor 720 removes a false-positive object classified into a noise class, among the at least one object, by the multi-object classification model.

Here, the multi-object classification model may output the probabilities of respective classes for the object included in the crop image.

For example, when crop images generated so as to correspond to at least one object are input to the multi-object classification model that has been trained in advance, the multi-object classification model may output the probabilities of respective classes for the object included in each of the crop images.

Here, when the probability of a noise class is highest, among the probabilities of the respective classes, the object may be classified into a noise class.

Accordingly, the object classified into a noise class may be regarded as a false-positive object, and may be removed in the object recognition process.

Here, the multi-object classification model may set a first weight for the image data and a second weight for the point cloud, and may output the probabilities of respective classes by applying the first weight and the second weight.

Here, the first weight may be set greater than the second weight.

That is, because the image data acquired using the camera includes texture data and color information and has higher spatial resolution than the point cloud acquired using the LiDAR sensor, a value greater than the second weight may be assigned to the first weight.

$\hat{y} = \lambda_{lidar} \times CS_{lidar} + \lambda_{cam} \times CP_{cam}$ $K \in N^1$ Number of class $\hat{y} \in R^{1 \times K}$ output $\lambda_{lidar} \in N^1$ lidar model's weight $CS_{lidar} \in R^{1 \times K}$ confidence score for lidar model $\lambda_{cam} \in N^1$ camera model's weight $CP_{cam} \in R^{1 \times K}$ class probabilities for camera model  (2)

For example, referring to Equation (2), the first weight may be λ cam, and the second weight may be λ lidar. Here, when λ cam is assigned a weight value of 1.5, λ lidar may be assigned a weight value of 1. Here, hyper parameter values, such as λ cam or λ lidar, may be set or changed differently depending on the specifications of the sensor that is used or the reliability of a deep-learning model.

Here, the class having the largest ŷ value, among ŷ values calculated using Equation (2), may be selected as the class into which the object is to be classified, and when the class having the largest ŷ value is a noise class, the object may be regarded as a false-positive object and removed from the object recognition result.

The memory 730 stores the multi-object classification model.

Also, the memory 730 stores various kinds of information generated in the above-described object recognition process performed by the automated driving system.

Here, the object recognition apparatus according to an embodiment of the present invention may operate in real time in an autonomous vehicle or an automated driving platform.

Using the object recognition apparatus, an object detected using LiDAR data is revalidated using image data, whereby the performance of classification of multiple objects into multiple classes may be improved, and the occurrence of false positives may be minimized.

Also, the trajectories of nearby dynamic objects or static objects are more accurately predicted using data acquired from a LiDAR sensor and a camera sensor mounted on an automated driving platform, whereby driving stability may be improved when autonomous driving is performed.

Also, objects are recognized using data including texture and color information based on image data, whereby the object recognition rate by an autonomous vehicle may be increased.

Figure 8:
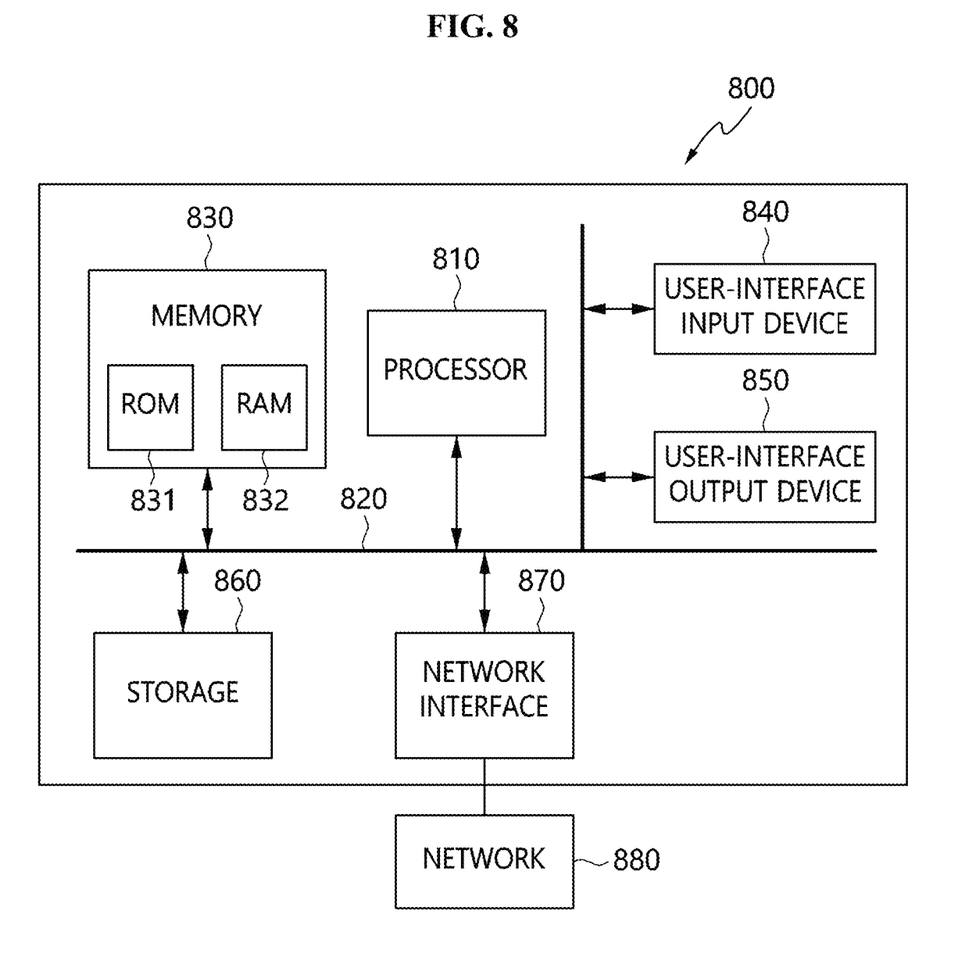
FIG. 8 is a view illustrating a computer system according to an embodiment of the present invention.

FIG. 8 is a view illustrating a computer system according to an embodiment of the present invention.

Referring to FIG. 8, an embodiment of the present invention may be implemented in a computer system including a computer-readable recording medium. As illustrated in FIG. 8, the computer system 800 may include one or more processors 810, memory 830, a user-interface input device 840, a user-interface output device 850, and storage 860, which communicate with each other via a bus 820. Also, the computer system 800 may further include a network interface 870 connected to a network 880. The processor 810 may be a central processing unit or a semiconductor device for executing processing instructions stored in the memory 830 or the storage 860. The memory 830 and the storage 860 may be any of various types of volatile or nonvolatile storage media. For example, the memory may include ROM 831 or RAM 832.

Accordingly, an embodiment of the present invention may be implemented as a nonvolatile computer-readable storage medium in which methods implemented using a computer or instructions executable in a computer are recorded. When the computer-readable instructions are executed by a processor, the computer-readable instructions may perform a method according to at least one aspect of the present invention.

According to the present invention, objects detected using LiDAR data are revalidated using image data, whereby the performance of classification of multiple objects into multiple classes may be improved and the occurrence of false positives may be minimized.

Also, the present invention enables the trajectories of nearby dynamic objects or static objects to be more accurately predicted using data acquired from a LiDAR sensor and a camera sensor mounted on an automated driving platform, thereby improving driving stability when autonomous driving is performed.

Also, the present invention recognizes objects using data including texture and color information based on image data, thereby increasing the object recognition rate by an autonomous vehicle.

As described above, the object recognition apparatus of an automated driving system using error removal based on object classification and the method using the same according to the present invention are not limitedly applied to the configurations and operations of the above-described embodiments, but all or some of the embodiments may be selectively combined and configured, so that the embodiments may be modified in various ways.

What is claimed is:

1. An object recognition method of an automated driving system, comprising:
    training a multi-object classification model based on deep learning using training data including a data set corresponding to a noise class, into which a false-positive object is classified, among classes classified by types of objects;
    acquiring a point cloud and image data respectively using a LiDAR sensor and a camera provided in an autonomous vehicle;
    extracting a crop image, corresponding to at least one object recognized based on the point cloud, from the image data and inputting the crop image to the multi-object classification model; and
    removing a false-positive object classified into the noise class, among the at least one object, by the multi-object classification model.

2. The object recognition method of claim 1, wherein the multi-object classification model outputs probabilities of respective classes for an object included in the crop image.

3. The object recognition method of claim 2, wherein removing the false-positive object is configured to classify the object into the noise class when a probability of the noise class is largest, among the probabilities of the respective classes.

4. The object recognition method of claim 2, wherein the multi-object classification model sets a first weight for the image data and a second weight for the point cloud and outputs the probabilities of the respective classes by applying the first weight and the second weight.

5. The object recognition method of claim 4, wherein the first weight is set greater than the second weight.

6. The object recognition method of claim 1, wherein training the multi-object classification model comprises:
    acquiring a point cloud for training and image data for training based on the LiDAR sensor and the camera;
    generating comment data using the point cloud for training and the image data for training; and
    generating training and verification data sets corresponding to the training data based on the comment data classified into classes.

7. The object recognition method of claim 6, wherein generating the comment data is configured to detect at least one object for training based on the point cloud for training and to project the at least one object for training to the image data for training using a projection matrix, thereby generating the comment data so as to correspond to a 2D image for the at least one object for training.

8. The object recognition method of claim 7, wherein the crop image is extracted so as to correspond to a process of generating the comment data.

9. The object recognition method of claim 1, further comprising:
    calibrating the LiDAR sensor and the camera.

10. The object recognition method of claim 9, wherein calibrating the LiDAR sensor and the camera is configured to perform calibration in such a way that an image is acquired by opening an aperture of the camera at a moment at which a laser beam of the LiDAR sensor passes a center of a field of view of the camera in order to synchronize the LiDAR sensor with the camera.

11. An object recognition apparatus of an automated driving system, comprising:
    a processor for training a multi-object classification model based on deep learning using training data including a data set corresponding to a noise class, into which a false-positive object is classified, among classes classified by types of objects, acquiring a point cloud and image data respectively using a LiDAR sensor and a camera provided in an autonomous vehicle, extracting a crop image corresponding to at least one object recognized based on the point cloud from the image data, inputting the crop image to the multi-object classification model, and removing a false-positive object classified into the noise class, among the at least one object, by the multi-object classification model; and
    memory for storing the multi-object classification model.

12. The object recognition apparatus of claim 11, wherein the multi-object classification model outputs probabilities of respective classes for an object included in the crop image.

13. The object recognition apparatus of claim 12, wherein the processor classifies the object into the noise class when a probability of the noise class is largest, among the probabilities of the respective classes.

14. The object recognition apparatus of claim 12, wherein the multi-object classification model sets a first weight for the image data and a second weight for the point cloud and outputs the probabilities of the respective classes by applying the first weight and the second weight.

15. The object recognition apparatus of claim 14, wherein the first weight is set greater than the second weight.

16. The object recognition apparatus of claim 11, wherein the processor is configured to:
   acquire a point cloud for training and image data for training based on the LiDAR sensor and the camera;
   generate comment data using the point cloud for training and the image data for training; and
   generate training and verification data sets, corresponding to the training data, based on the comment data classified into classes.

17. The object recognition apparatus of claim 16, wherein the processor detects at least one object for training based on the point cloud for training and projects the at least one object for training to the image data for training using a projection matrix, thereby generating the comment data so as to correspond to a 2D image for the at least one object for training.

18. The object recognition apparatus of claim 17, wherein the crop image is extracted so as to correspond to a process of generating the comment data.

19. The object recognition apparatus of claim 11, wherein the processor calibrates the LiDAR sensor and the camera.

20. The object recognition apparatus of claim 19, wherein the processor performs calibration in such a way that an image is acquired by opening an aperture of the camera at a moment at which a laser beam of the LiDAR sensor passes a center of a field of view of the camera in order to synchronize the LiDAR sensor with the camera.

* * * * *